(12) United States Patent
Beard et al.

(10) Patent No.: US 8,815,090 B2
(45) Date of Patent: Aug. 26, 2014

(54) FILTER WITH WATER SEPARATION DEVICE

(75) Inventors: John H. Beard, Kearney, NE (US);
Farrell F. Calcaterra, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 425 days.

(21) Appl. No.: 12/139,606

(22) Filed: Jun. 16, 2008

(65) Prior Publication Data

US 2009/0308803 A1    Dec. 17, 2009

(51) Int. Cl.
*B01D 35/04*  (2006.01)
*B01D 36/00*  (2006.01)
*B01D 29/21*  (2006.01)

(52) U.S. Cl.
CPC ........ *B01D 36/006* (2013.01); *B01D 2201/304* (2013.01); *B01D 29/21* (2013.01); *B01D 2201/0415* (2013.01); *B01D 2201/298* (2013.01); *B01D 2201/295* (2013.01)
USPC ............ 210/305; 210/306; 210/299; 210/308

(58) Field of Classification Search
CPC ...... B01D 35/15; B01D 36/003; B01D 36/03; B01D 36/04; B01D 2201/298
USPC ......... 210/294, 304, 305, 306, 307, 311, 320, 210/513, 800
See application file for complete search history.

(56) References Cited

U.S. PATENT DOCUMENTS

| | | | |
|---|---|---|---|
| 1,761,924 A | 6/1930 | Kamrath | |
| 3,361,260 A | 1/1968 | Buckman | |
| 3,370,708 A | 2/1968 | Hultgren et al. | |
| 3,384,241 A | 5/1968 | Nostrand | |
| 3,420,377 A | 1/1969 | Vandersip | |
| 3,931,011 A | 1/1976 | Richards et al. | |
| 3,988,244 A | 10/1976 | Brooks | |
| 4,017,397 A | 4/1977 | Copeland | |
| 4,372,847 A | 2/1983 | Lewis | |
| 4,719,012 A | 1/1988 | Groezinger et al. | |

(Continued)

FOREIGN PATENT DOCUMENTS

| | | |
|---|---|---|
| DE | 199 60 600 A1 | 6/2001 |
| EP | 0839563 A1 | 5/1998 |

(Continued)

OTHER PUBLICATIONS

Dahl Baldwin, Marine Diesel Fuel/Water Separators, Installation pamphlet, 2005, 9 pages, pp. 1-9.

*Primary Examiner* — Tony G Soohoo
*Assistant Examiner* — Peter Keyworth
(74) *Attorney, Agent, or Firm* — Reinhart Boerner Van Deuren P.C.

(57) ABSTRACT

A filter, filter element and filter assembly are provided. The filter includes a water separating device for separating water from a dirty fluid flow. The water separator includes a fluid flow path that varies in cross-sectional area to vary pressure of the fluid therethrough. A top portion of the water separator is formed as a structurally independent piece from a bottom portion of the water separator. The top portion may be permanently or releasably secured to filter media of the filter via an end cap coupled to an end of the filter media. The bottom portion may be integrally or releasably secured to a housing of the filter. The bottom portion may also be integrally formed with a center tube upon which a filter element mounts.

19 Claims, 12 Drawing Sheets

(56) References Cited

U.S. PATENT DOCUMENTS

| | | | |
|---|---|---|---|
| 4,812,235 A | 3/1989 | Seleman et al. |
| 4,915,831 A | 4/1990 | Taylor |
| 5,078,877 A | 1/1992 | Cudaback et al. |
| 5,102,541 A | 4/1992 | Breitbach |
| 5,110,460 A * | 5/1992 | Gilas ........................... 210/149 |
| 5,114,572 A | 5/1992 | Hunter et al. |
| 5,203,994 A | 4/1993 | Janik |
| 5,215,658 A | 6/1993 | Luby |
| 5,259,953 A | 11/1993 | Baracchi et al. |
| 5,302,284 A | 4/1994 | Zeiner et al. |
| 5,339,787 A | 8/1994 | Jungquist et al. |
| 5,342,511 A | 8/1994 | Brown et al. |
| 5,350,506 A | 9/1994 | Dombek et al. |
| 5,362,390 A | 11/1994 | Widenhoefer et al. |
| 5,364,528 A | 11/1994 | Schwarz et al. |
| 5,390,701 A | 2/1995 | Lessley et al. |
| 5,462,658 A | 10/1995 | Sem |
| 5,486,288 A | 1/1996 | Stanford et al. |
| 5,560,824 A | 10/1996 | Sann et al. |
| 5,674,393 A | 10/1997 | Terhune et al. |
| 5,698,093 A | 12/1997 | Pyle et al. |
| 5,744,030 A | 4/1998 | Reid et al. |
| 5,766,468 A | 6/1998 | Brown et al. |
| 5,788,859 A | 8/1998 | Biere |
| 5,817,234 A | 10/1998 | Dye et al. |
| 5,837,137 A | 11/1998 | Janik |
| 5,868,932 A | 2/1999 | Guichaoua et al. |
| 5,906,737 A | 5/1999 | Hoeppner |
| 5,938,921 A | 8/1999 | Janik et al. |
| 5,985,142 A | 11/1999 | Belden |
| 5,988,399 A | 11/1999 | Brown et al. |
| 6,048,455 A | 4/2000 | Janik |
| 6,068,763 A | 5/2000 | Goddard |
| 6,171,491 B1 | 1/2001 | Popoff et al. |
| 6,187,188 B1 | 2/2001 | Janik et al. |
| 6,189,513 B1 | 2/2001 | Brown et al. |
| 6,193,884 B1 | 2/2001 | Magnusson et al. |
| 6,207,052 B1 | 3/2001 | Webb |
| 6,387,259 B1 | 5/2002 | Roll |
| 6,428,700 B1 * | 8/2002 | Brown et al. ............... 210/380.1 |
| 6,471,070 B2 | 10/2002 | Janik |
| 6,485,635 B1 | 11/2002 | Gandini et al. |
| 6,488,845 B1 | 12/2002 | Neufeld et al. |
| 6,495,042 B1 | 12/2002 | Knight |
| 6,500,335 B2 | 12/2002 | Janik et al. |
| 6,506,302 B2 | 1/2003 | Janik |
| 6,517,717 B1 | 2/2003 | Håkansson |
| D472,299 S | 3/2003 | Fritze |
| D472,604 S | 4/2003 | Fritze |
| 6,565,746 B1 | 5/2003 | Stamey, Jr. et al. |
| 6,615,990 B1 | 9/2003 | Jokschas et al. |
| 6,652,740 B2 | 11/2003 | Schoess |
| 6,662,954 B2 | 12/2003 | Gottwald-Grill et al. |
| 6,673,250 B2 | 1/2004 | Kuennen et al. |
| 6,723,239 B2 * | 4/2004 | Maxwell ........................ 210/235 |
| 6,740,234 B1 | 5/2004 | Williams et al. |
| 6,863,811 B2 | 3/2005 | Janik |
| 6,881,334 B2 | 4/2005 | Janik |
| 6,896,803 B2 | 5/2005 | Cline et al. |
| 6,926,156 B2 | 8/2005 | Wall |
| 6,926,827 B2 | 8/2005 | Gruca et al. |
| 6,977,006 B2 | 12/2005 | Reid |
| 7,042,346 B2 | 5/2006 | Paulsen |
| 7,048,488 B1 | 5/2006 | Kuznetsov et al. |
| 7,070,692 B2 | 7/2006 | Knight |
| 7,081,201 B2 | 7/2006 | Bassett et al. |
| 7,390,407 B2 | 6/2008 | Weindorf et al. |
| 7,744,758 B2 | 6/2010 | Dworatzek et al. |
| 8,057,669 B2 | 11/2011 | Beard et al. |
| 8,128,819 B2 | 3/2012 | Beard et al. |
| 2002/0014452 A1 | 2/2002 | Janik |
| 2002/0020660 A1 | 2/2002 | Jainek et al. |
| 2002/0139731 A1 | 10/2002 | Michels et al. |
| 2002/0166805 A1 | 11/2002 | Minns et al. |
| 2002/0185454 A1 | 12/2002 | Beard et al. |
| 2003/0019819 A1 | 1/2003 | Fritze |
| 2003/0178354 A1 | 9/2003 | Wall |
| 2003/0226800 A1 | 12/2003 | Brown et al. |
| 2004/0144713 A1 | 7/2004 | Bassett et al. |
| 2005/0056582 A1 | 3/2005 | Patel et al. |
| 2005/0103692 A1 | 5/2005 | Stanhope et al. |
| 2005/0161378 A1 | 7/2005 | Cline |
| 2005/0161386 A1 | 7/2005 | Gustafson et al. |
| 2005/0189288 A1 | 9/2005 | Hershberger et al. |
| 2005/0194317 A1 | 9/2005 | Ikeyama et al. |
| 2006/0016745 A1 | 1/2006 | Nguyen et al. |
| 2006/0016769 A1 | 1/2006 | Hacker et al. |
| 2006/0054547 A1 | 3/2006 | Richmond et al. |
| 2006/0060512 A1 | 3/2006 | Astle et al. |
| 2006/0096934 A1 | 5/2006 | Weinberger et al. |
| 2006/0118475 A1 | 6/2006 | Girondi |
| 2006/0124516 A1 | 6/2006 | Merritt et al. |
| 2006/0151371 A1 | 7/2006 | Weinberger et al. |
| 2006/0180539 A1 | 8/2006 | Wolf et al. |
| 2006/0186031 A1 | 8/2006 | Fick et al. |
| 2006/0191836 A1 | 8/2006 | Dworatzek et al. |
| 2006/0219621 A1 | 10/2006 | Dworatzek |
| 2006/0219626 A1 | 10/2006 | Dworatzek et al. |
| 2007/0215561 A1 | 9/2007 | Yates et al. |
| 2008/0035537 A1 | 2/2008 | Klein et al. |
| 2008/0202081 A1 | 8/2008 | Schmid et al. |
| 2008/0245719 A1 | 10/2008 | Beard et al. |
| 2008/0264850 A1 | 10/2008 | Amesoder et al. |
| 2009/0014381 A1 | 1/2009 | South et al. |
| 2009/0301949 A1 | 12/2009 | Kolczyk et al. |
| 2009/0308801 A1 | 12/2009 | Beard et al. |
| 2009/0308802 A1 | 12/2009 | Beard et al. |

FOREIGN PATENT DOCUMENTS

| | | |
|---|---|---|
| EP | 0 880 987 A1 | 12/1998 |
| EP | 1124056 A2 | 8/2001 |
| GB | 2114237 A | 8/1983 |
| JP | S55-102916 | 7/1980 |
| JP | 9173717 | 7/1997 |
| WO | WO 2007/053228 A2 | 5/2007 |

* cited by examiner

US 8,815,090 B2

FILTER WITH WATER SEPARATION DEVICE

FIELD OF THE INVENTION

This invention generally relates to fluid filtration and more particularly to filter assemblies for separating water from another fluid and filters or filter elements for use therein.

BACKGROUND OF THE INVENTION

Filters are used in filtration systems to filter impurities from fluid such as fuels or lubricants, prior to the fluid being used in a downstream system such as an engine or a transmission. The use of replaceable filters allows the user to replace a relatively inexpensive or easily removable wear part when the filter media, which collects and removes the impurities from the fluid, becomes spent, rather than requiring replacement of the entire filtration system.

In some filtration systems, particularly filtration systems for filtering fuel, water is one of the impurities that is removed from the filtered fluid. Water may be removed from flowing fuel by causing the water to coalesce such that it will be stripped or fall out of the flowing fuel. The coalescing and stripping of the water may be effectuated by a filter media, an arrangement of the fluid flow path or by other devices.

The present invention relates to improvements in filters and filter assemblies that include devices for coalescing and/or removing water from a fluid stream.

BRIEF SUMMARY OF THE INVENTION

Embodiments of the present invention may have several aspects that may be claimed and stand as patentable independently and individually or in combination with other aspects, including but not limited to the following.

In a first aspect, an embodiment of the present invention provides a filter element that includes a portion of a water separator that is combinable with another portion of a water separator to provide a water separator for separating water from a dirty fluid flow. In practicing the embodiment, the filter element is insertable into a housing and includes a tubular ring of filter media, first and second end caps and at least a portion of a water separator. The tubular ring of filter media defines an internal cavity. The first and second end caps are sealingly secured to first and second ends of the filter media. The portion of the water separator is secured to the filter media. The portion forms an axially exposed coalescing surface facing axially away from the filter media.

In another embodiment of the invention, a filter including a housing, a tubular ring of filter media, a first end cap and a water coalescing cone is provided. The housing has a sidewall defining a central cavity. The tubular ring of filter media defines an internal cavity removably positioned within the central cavity. The first end cap sealingly secures to an end of the tubular ring of filter media and defines a dirty fluid flow port. The water coalescing cone has a top portion mounted to the tubular ring of filter media and a bottom portion mounted to the housing. The top and bottom portions combine to form a generally conical coalescing flow path therebetween in fluid communication with the dirty fluid flow port.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
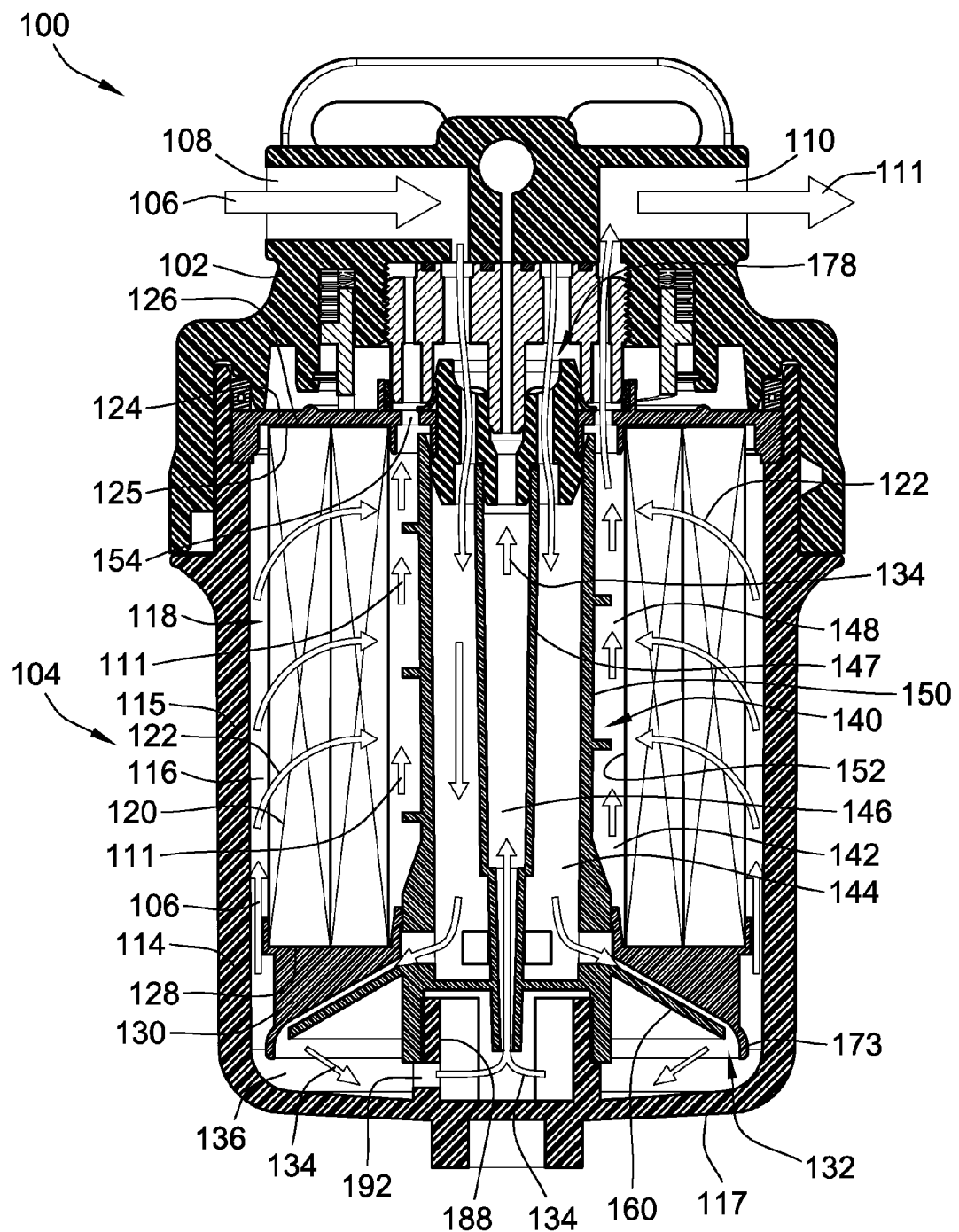
FIG. 1 is a cross-sectional illustration of an exemplary embodiment of a filter assembly in accordance with the teachings of the present invention.

FIG. 1 illustrates a first embodiment of a filter assembly 100 according to the teachings of the present invention. The filter assembly 100 generally includes a filter base 102 and a filter 104.

The filter 104 connects to the filter base 104 and acts to filter impurities from fluid passing through the filter assembly 100.

Dirty fluid (illustrated as arrows identified with reference numeral 106) enters the filter assembly 100 through a dirty fluid inlet port 108 of the filter base 102. Dirty fluid 106 is supplied from a system such as an engine or from a fluid storage tank such as fuel tank (neither shown). After entering and passing through the filter base 102, the dirty fluid 106 passes through the filter 104 and is cleaned. The clean fluid (illustrated as arrows 111) then exits the filter assembly 100 through clean fluid port 110 of the filter base 102 and travels to the system that utilizes the clean fluid.

The filter 104 of FIG. 1 includes an outer housing 114 having an annular side wall 115 that defines an internal cavity 116 that houses a replaceable filter element 118. The filter element 118 includes a tubular ring of filter media 120 which separates impurities from the dirty fluid as it passes therethrough, as illustrated by arrows 122.

A cover, in the form of a top end cap 124 is sealingly connected to a top end 126 of the tubular ring of filter media 120. The cover closes an open end of housing 114 opposite a generally closed bottom end wall 117. In other embodiments, the end cap and cover could be formed as separate components. The illustrated filter media 120 is a combination of a pair of concentric rings of filter media. However, alternative filer media could be used. For example, a single tubular ring of filter media could be used.

The sealing connection is generally formed between an inner face 125 of the top end cap 124 and the top end 126 of the ring of filter media 120 to prevent fluid bypass therebetween. By preventing fluid bypass, the dirty fluid 106 is forced to pass through the filter media 120.

The sealing connection between the top end cap 124 and ring of filter media 120 may be provided by any connection. By way of example only, the top end cap 124 may be potted to the ring of filter media 120 using an adhesive such as, for example, Plastisol or epoxy, the ring of filter media 120 may be ultrasonically bonded to the top end cap 124, the ring of filter media 120 may be embedded into the top end cap 124, the end cap 124 may be molded or over molded onto the end of the filter media 120 or any other means of providing a sealing connection may be implemented.

The bottom end 128 of the ring of filter media 120 is sealingly connected to a bottom end cap 130. The bottom end 128 and bottom end cap 130 may be sealingly connected in a similar or different manner as the connection between the top end cap 124 and top end 126.

The top and bottom end caps 124, 130 bound the filter media 120 to prevent bypass or short circuiting of the filter media 120 by dirty fluid 106.

The bottom end cap 130 forms a portion of a water separating device, illustrated in the form of a cone separator 132 to assist in separating water from the dirty fluid 106 prior to the dirty fluid 106 passing through the filter media 120. The separated water, illustrated as arrows 134, can then be held in a reservoir 136 between the bottom end cap 130 and the bottom end wall 117 of housing 114 from which the water 134 may ultimately be evacuated from the filter assembly 100 altogether.

The filter assembly 100 further includes a center tube 140 that is positioned within a internal cavity 142 of the tubular ring of filter media 120. The center tube 140 defines outer and inner fluid flow passages 144, 146 that direct separated and oppositely flowing fluid flows of the dirty fluid 106 and separated water 134 between the top and bottom ends 126, 128 of the filter media 120.

The outer fluid flow passage 144 provides a flow path for dirty fluid 106 through the internal cavity 142 of the filter media 120 to the cone separator 132, while the inner fluid flow passage 146 provides a flow path for the separated water 134 to be evacuated from the filter 104, and ultimately out of the filter base 102. The outer and inner flow passages 144, 146 are separated by an annular wall 147 of the center tube 140. The annular wall 147 extends into reservoir 136 and acts as a drain pipe to evacuate the separated water 134 from the reservoir 136 and filter 104 more generally.

Additionally, a clean fluid cavity 148 is formed between an outer wall 150 of the center tube 140 and an inner side 152 (or clean fluid side) of the ring of filter media 120. The outer wall 150 of the center tube 140 separates the outer fluid flow passage 144, through which dirty fluid 106 flows, from the clean fluid cavity 148, to prevent mixing of the dirty and clean fluids 106, 111.

The top end cap 124 further defines a clean fluid outlet 154, which fluidly communicates the clean fluid cavity 148 with the exterior of the filter 104, and ultimately with the clean fluid port 110 of the filter base 102. As illustrated, the clean fluid outlet 154 is in the form of a plurality of apertures that pass axially through the top end cap 124.

As illustrated, the top end cap 124 forms a cover of the filter 104 which requires clean and dirty fluid 111, 106 to flow therethrough to exit and enter the filter 104. In other embodiments, the cover may be separate and independent from the end cap 124.

In this embodiment, while the bottom end cap 130 forms a first portion of the cone separator 132, the center tube 140 includes a cone portion 160 that forms a second portion of the cone separator 132.

Figure 2:
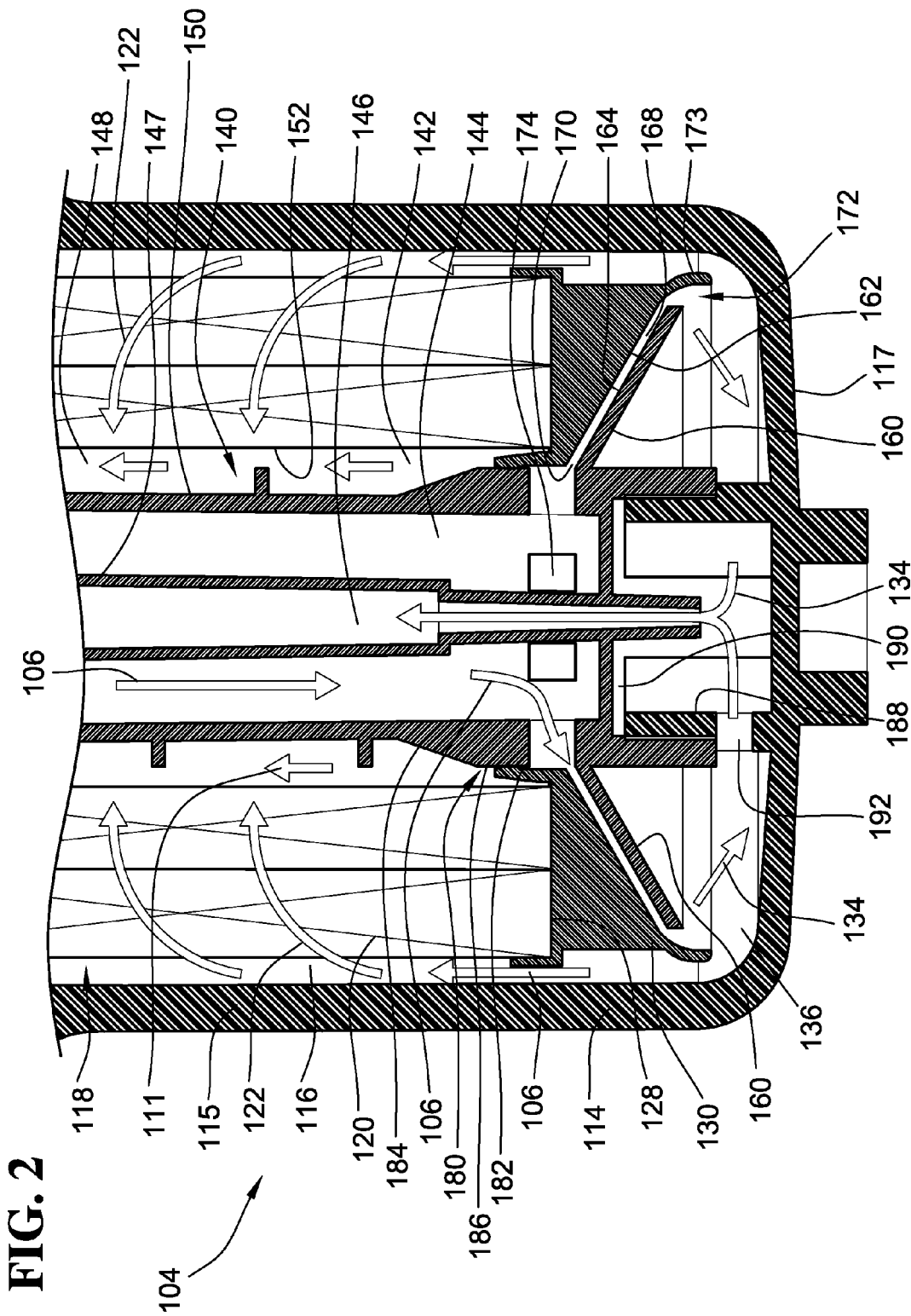
FIG. 2 is an enlarged illustration of a portion of the filter of the filter assembly of FIG. 1.

More particularly and with primary reference to FIG. 2, a generally frustoconical bottom surface 162 of the bottom end cap 130 cooperates with a frustoconical top surface 164 of the cone portion 160 of the center tube 140. Bottom surface 162 is a generally concave surface, while top surface 164 is a cooperating convex surface. The bottom and top surfaces 162, 164 are coalescing surfaces that cooperate to form a generally frustoconical fluid flow passage 168 therebetween. The flow passage 168 extends between inlet 170 to outlet 172.

Due to the direction of flow, the flow passage 168 increases in flow path area as the fluid flows radially outward and axially downward from inlet 170 toward outlet 172. The increase in area can facilitate a reduction in fluid pressure which promotes slowing of the fluid flow and thus coalescing of water entrained within the dirty fluid 106 such that water will separate from the dirty fluid 106 passing through the fluid flow passage 168.

The separation of water 134 from the dirty fluid 106 is promoted by the change in fluid flow after the dirty fluid 106 exits outlet 172 due to the differences in densities of the dirty fluid (typically fuel) and water 134.

Bottom end cap 130 includes a downward extending annular flange 173 that includes an inner surface that forms part of bottom surface 162. This annular flange 173 directs fluid flow toward bottom end wall 117 further increasing the amount of change in fluid flow. The annular flange 173, as illustrated, extends axially closer to the bottom end all 117 than a distal end of cone portion 160. Further, the inner surface of annular flange 173, which forms part of surface 164, faces radially inward.

The top surface or bottom surface 162, 164 may include ribs or other structure to locate bottom end cap 130 relative to cone portion 160 and, more particularly, top surface 164 relative to the bottom surface 162 to maintain the flow passage 168 therebetween. Such ribs may be particularly useful during assembly of filter 104. However, these ribs are not illustrated, nor are they required as the filter element 118 may be located within the housing 114 so as to maintain the flow passage 168 in other ways.

In operation, dirty fluid 106 flows axially through an outer flow path 144 of the center tube 140. The dirty fluid 106 exits the outer flow path 144 through ports 174, and enters the frustoconical fluid flow path 168 through inlet portion 170. As the dirty fluid 106 flows through the fluid flow path 168, the pressure of the dirty fluid drops 106 due to the change in cross-sectional area of the flow path 178 in the direction of travel toward exit 172.

As the dirty fluid 106 exits the fluid flow path 168, the separated water 134 remains in the reservoir 136 while the dirty fluid 106 flows axially back toward the filter base 102 and ultimately through the filter media 120, as illustrated by arrows 122, into clean fluid cavity 148 formed between an inner surface 152 of the filter media and outer wall 150 of the center tube 140.

In the illustrated embodiment, the filter element 118 is formed by the filter media 120, top end cap 124 and the bottom end cap 130. A top grommet 178 that interacts and interfaces with the filter base 102 is an optional component of the filter element 118. The filter element 118 is removable from housing 116, which is reusable, such that it is replaceable when spent.

The filter element 118 is independent of center tube 140 such that the center tube can be reused. As such, the center tube 140 can be removed from filter element 11 8. The center tube 140 extends through an aperture 180 formed in the bottom end cap 130. The aperture 180 is bounded by a lip seal formed by deformable flange 182. Flange 182 seals against the outer surface 184 of a radially stepped out portion 186 of the center tube 140.

The center tube 140 mounts to an axially extending boss 188 of housing 114. Center tube 140 includes cavity 190 which receives the distal free end of boss 188. Boss 188 includes a flow port 192 that permits the separated water 134 to enter into a cavity of boss 188. Once in the cavity, the separated water 134 may be drawn through the inner flow path 146 of the center tube 140 and evacuated from the filter 104.

The center tube 140 may be permanently affixed to the boss 188, such that the center tube 140 remains with the housing 114 when the filter element 118 is removed from the housing 114.

Alternatively, the center tube 140 can be releasably mounted to boss 188 such that the center tube 140 can be easily removed from the housing 114. The center tube 140 may be removed as the filter element 118 is removed from the housing 114 or it could be sufficiently secured to boss 188 that it remains with the filter housing 114 as the filter element 118 is removed (see e.g. FIG. 3), but it can be removed from the housing by easily pulling on the center tube 140 after the filter element 118 has been removed from housing 114.

Figure 3:
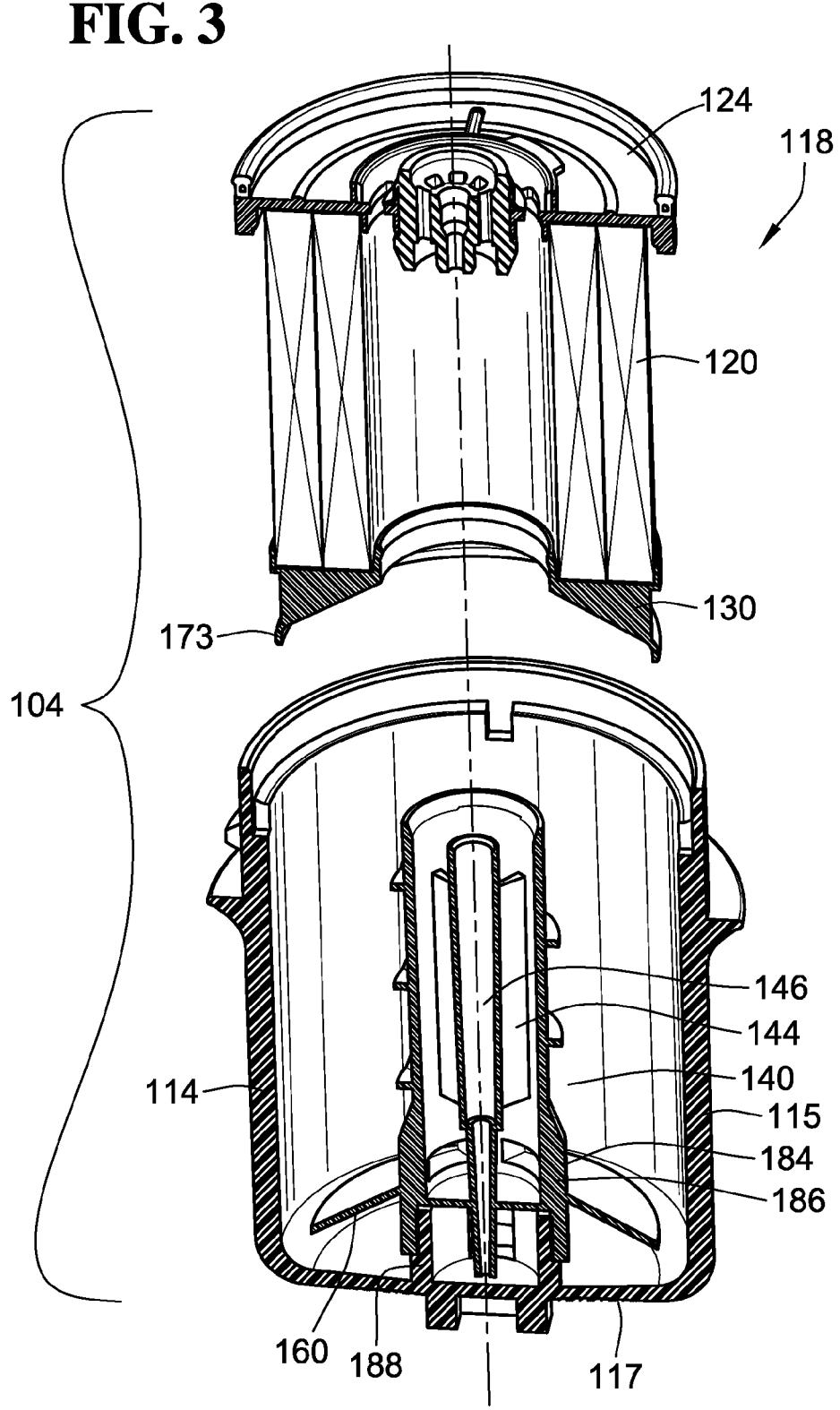
FIG. 3 is a partially exploded illustration of the filter of FIG. 1, illustrated in cross-section and perspective.

As such, in some embodiments, the filter element 118 includes only a portion of the cone separator 132 such that when the filter element 118 is removed from the housing 114, the cone separator 132 is inoperable (such as in the configuration as illustrated in FIG. 3). As such, for the cone separator 132 to operate, the filter element 118 must be added to a housing 114 that includes the other portion of the cone separator, namely the bottom cone portion 160.

As illustrated, boss 188 is formed by a plurality of wall portions and is not a continuous annular wall. However, boss 188 could be formed as continuous ring having water flow ports formed therethrough.

Figure 4:
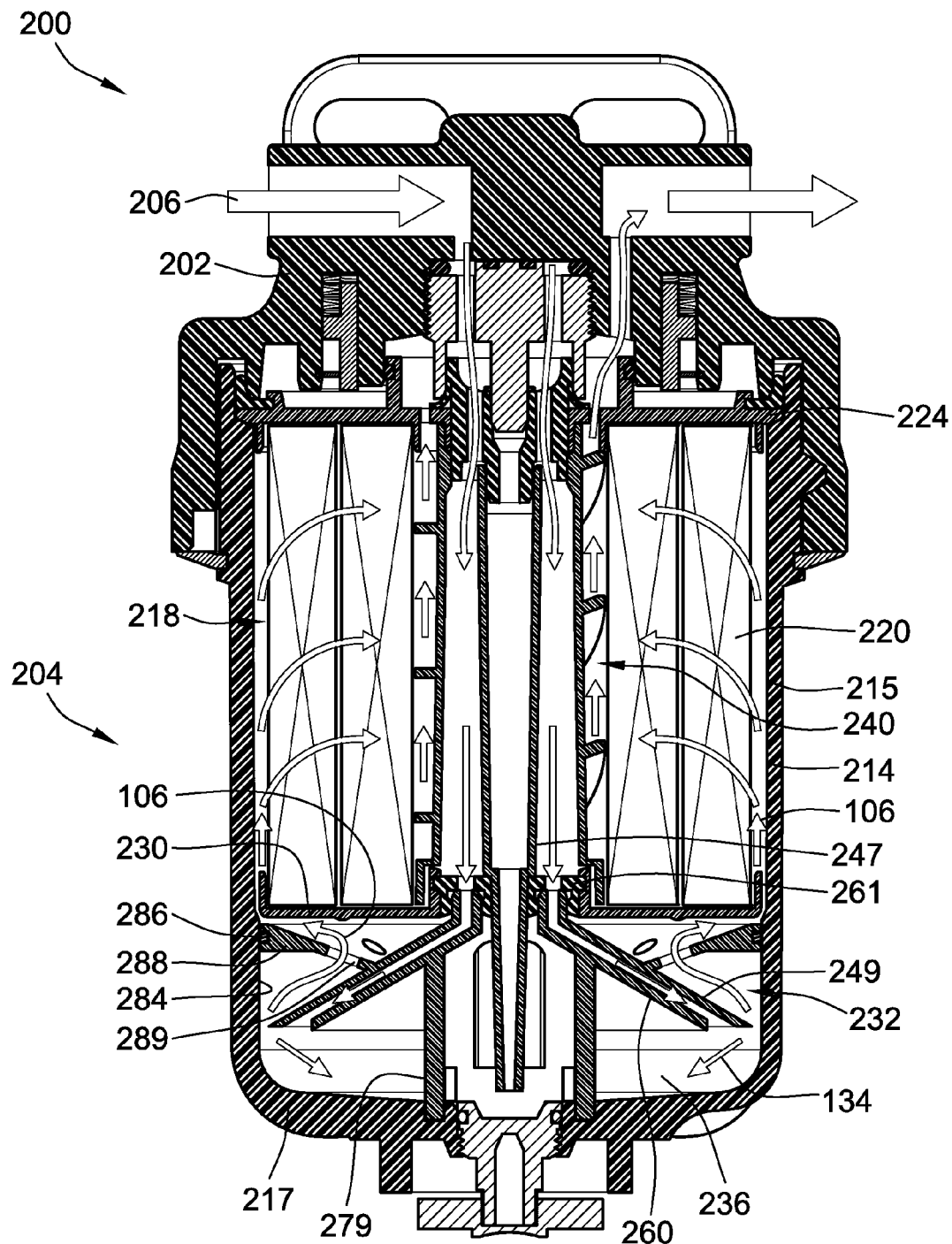
FIG. 4 is a cross-sectional illustration of a further exemplary embodiment of a filter assembly in accordance with the teachings of the present invention.
Figure 5:
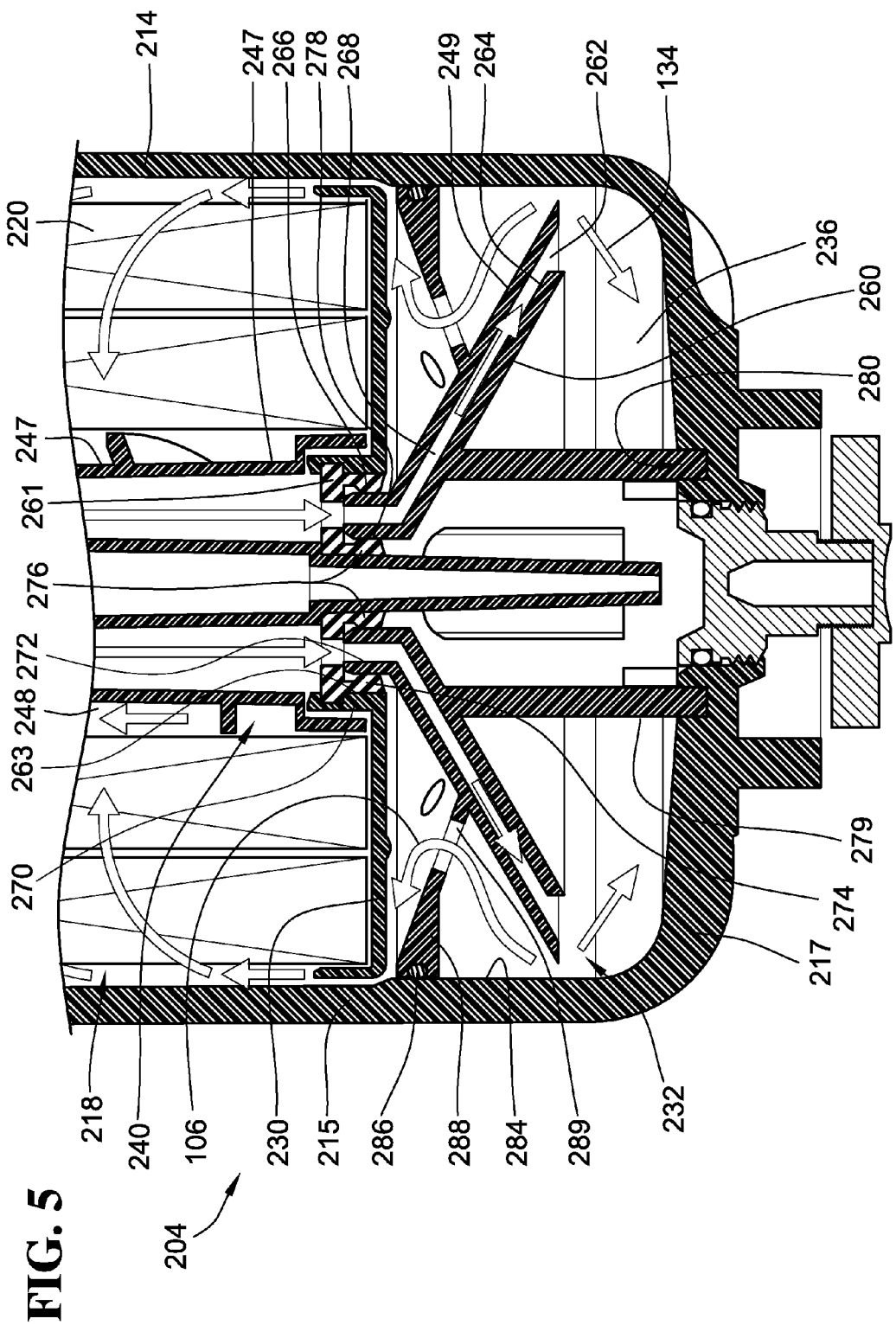
FIG. 5 is an enlarged illustration of a portion of the filter of the filter assembly of FIG. 4.
Figure 6:
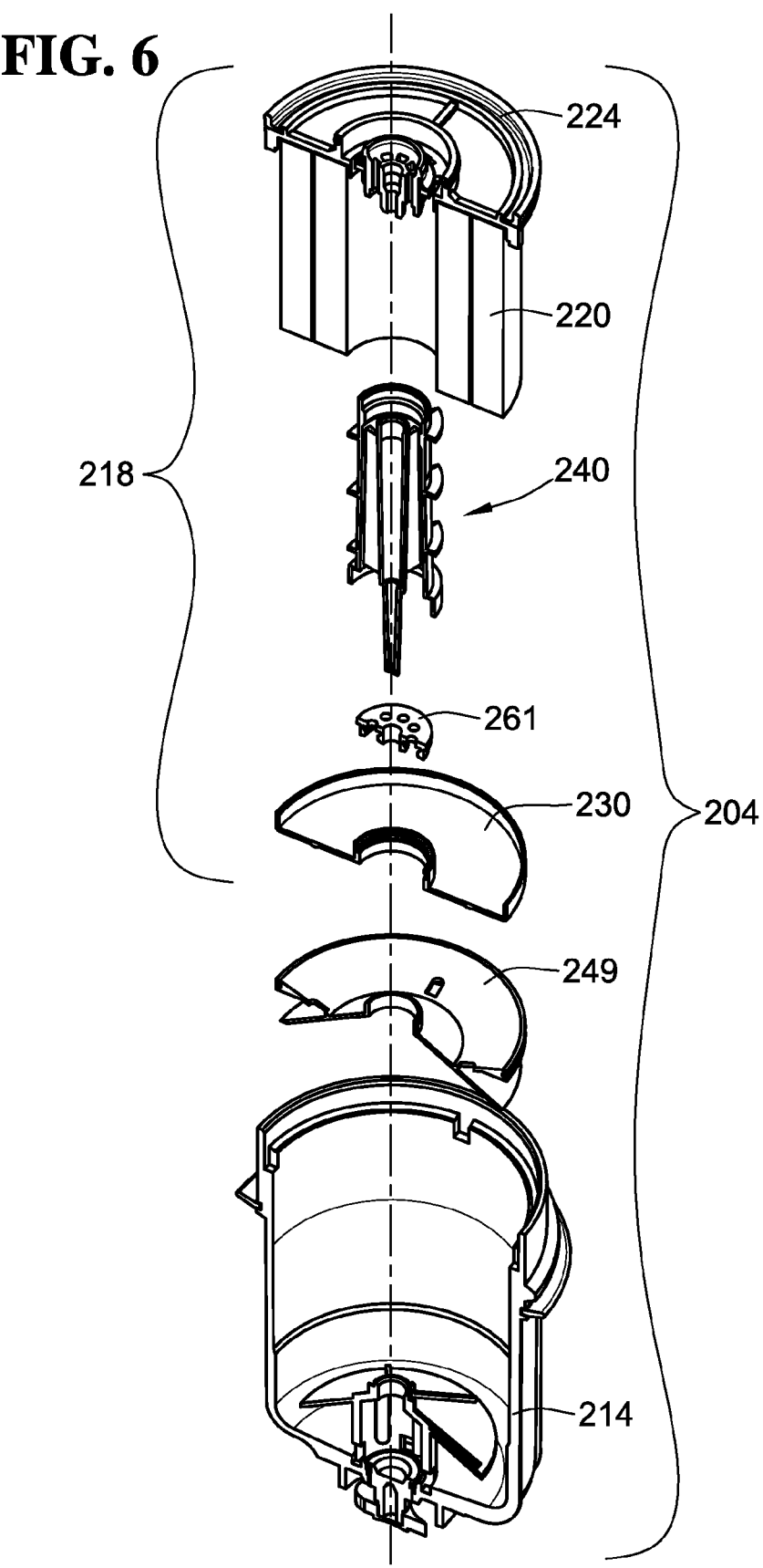
FIG. 6 is a partially exploded illustration of the filter of FIG. 4, illustrated in cross-section and perspective.

A second alternative embodiment of a filter assembly 200 including a filter head 202 and filter 204 according to the teachings of the present invention is illustrated in FIGS. 4-6.

In this embodiment, the center tube 240 does not directly mount to the filter housing 214. Instead, the center tube 240 forms a part of the filter element 218. As such, when the filter element 218 is replaced, the center tube 240 is similarly replaced. The center tube 240 is permanently secured to the filter element 218 as it includes a primary body portion that is axially interposed between the top and bottom end caps 224, 230. However, a portion of the center tube 240, and particularly inner wall 247, extends axially beyond the bottom end cap 230 through an aperture in the bottom end cap 230. This portion extends into reservoir 236 to eventually communicate with any water 134 that is stripped from the dirty fluid 106.

The cone separator 232 includes a top cone portion 249 and bottom cone portion 260. The top and bottom cone portions 249 are independent structures. In this embodiment, the top cone portion 249 is formed as a separate component independent of bottom end cap 230. The bottom cone portion 260 is formed as a separate component independent of center tube 240.

The top and bottom cone portions 249, 260 include frustoconical surfaces 262, 264 and define flow path 268 therebetween (see FIG. 5).

The bottom end cap 230 and top cone portion 249 may be connected to one another by seal member 261. As illustrated, the seal member 261 engages a radially inner surface 263 of a central aperture of the bottom end cap 230. The seal member 261 also radially engages a radially outer surface 266 of top cone portion 249. More particularly, the bottom end cap 230 includes an axially extending flange 270, which happens to extend axially into the cavity 248 formed by the filter media 220. The top cone portion 249 includes a corresponding axially extending flange 272 that is sized smaller than and is received within the axially extending flange 270 of the bottom end cap 230.

Flange 274 prevents dirty fluid 106 from passing between bottom end cap 230 and the top cone portion 249 and thereby bypass the filter media 220.

An axially extending flange portion 274 of seal member 261 is radially interposed between the two axially extending flange portions 270, 272 of the bottom end cap 230 and top cone portion 249, respectively. The axially extending flange portion 274 may include a resilient protrusion portion that facilitates engagement between seal member 261 the bottom end cap 230 and the top cone portion 249.

The seal member 261 further includes an inner axially extending flange portion 276 that is radially interposed between inner wall 247 of the center tube 240 and an axially extending flange portion 278 of the bottom cone portion 260 of the cone separator 232. The inner flange portion 276 prevents fluid from passing between wall 247 of the center tube 240 and the bottom cone portion 260 which would permit dirty fluid 106 to bypass the flow path 268.

The bottom cone portion 260 of this embodiment is connected to a bottom end wall 217 of the housing 214. As illustrated, the bottom cone portion 260 includes an annular boss or base portion 279 that is received in an annular groove 280 formed in the bottom end wall 217. The bottom cone portion 260 may be mechanically secured in the groove 280, such as by snapping, ultrasonic welding, threading, gluing, etc. In some embodiments, the bottom cone portion 260 may be removable from the housing 214.

Alternatively, the bottom cone portion 260 could be integrally formed as unitary piece with the housing 214, and particularly end wall 217.

The top cone portion 249 sealingly engages the inner surface 284 of the sidewall 215 of housing 214. In the illustrated embodiment, the top cone portion 249 includes a radially sealing gasket 286 that seals with the inner surface 284. A mounting flange 288 of the top cone portion 249 carries sealing gasket 286. The mounting flange 288 includes a plurality of flow ports 289 that permit the dirty fluid 106 that has passed through the fluid flow path 268 to flow axially towards filter media 220 from the reservoir 236.

In some embodiments, the engagement between the top cone portion 249 and sidewall 215 is greater than the engagement between the bottom end cap 230 and the top cone portion 249 such that the top cone portion 249 remains with the housing 214 when the filter element 218 is removed from housing 214.

In alternative embodiments, the engagement between the top cone portion 249 and the sidewall 215 is less than the engagement between the bottom end cap 230 and the top cone portion 249 such that the top cone portion 249 remains with the filter element 218 when the filter element 218 is removed from housing 214. However, in this embodiment, the top cone portion 249 may be removable from the filter element 218 by slightly greater force such that the top cone portion 249 can be reused.

Filter elements 218 of this embodiment may or may not include the bottom cone portion 249.

Figure 7:
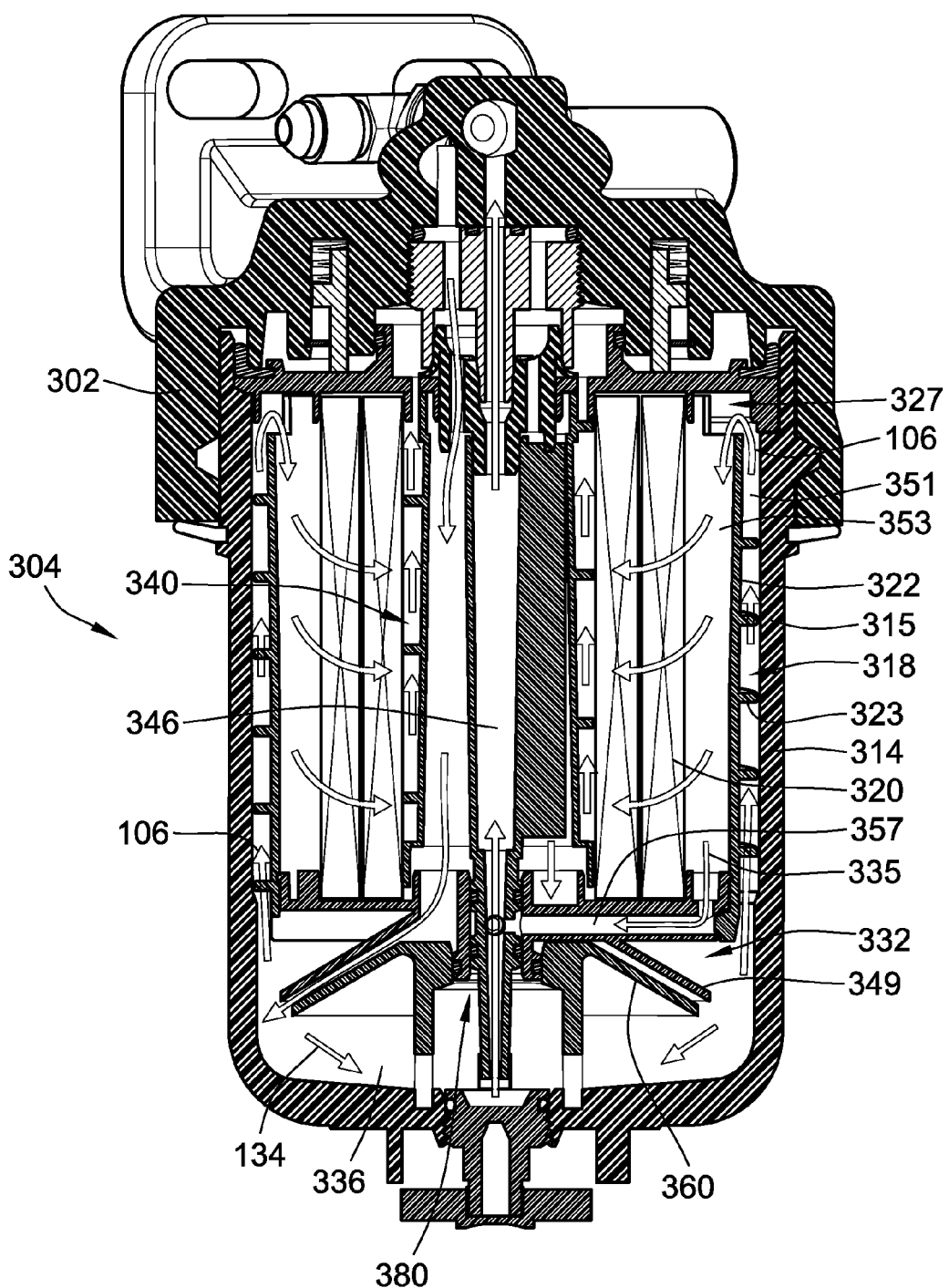
FIG. 7 is a cross-sectional illustration of a further exemplary embodiment of a filter assembly in accordance with the teachings of the present invention.
Figure 8:
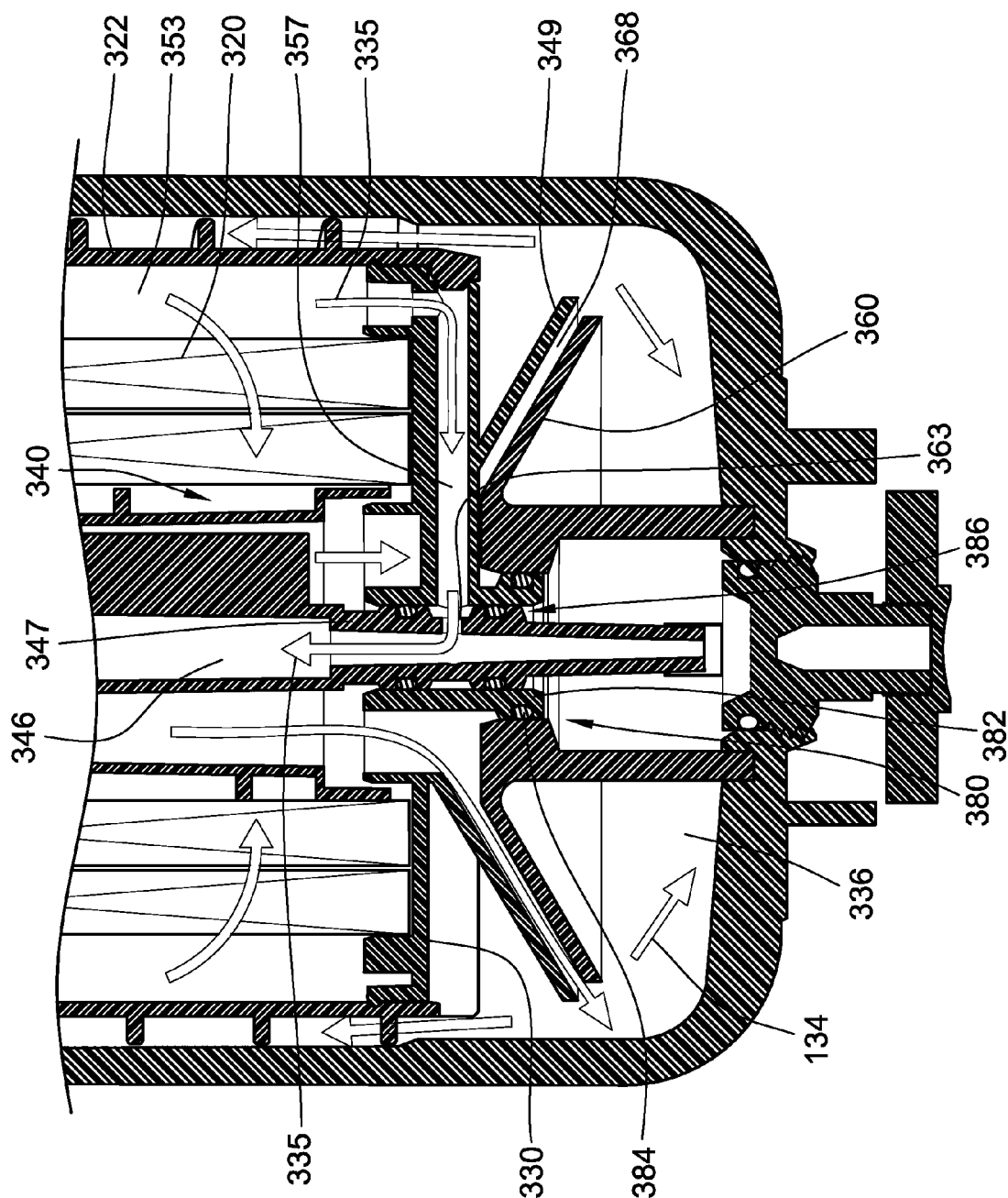
FIG. 8 is an enlarged illustration of a portion of the filter of the filter assembly of FIG. 7.
Figure 9:
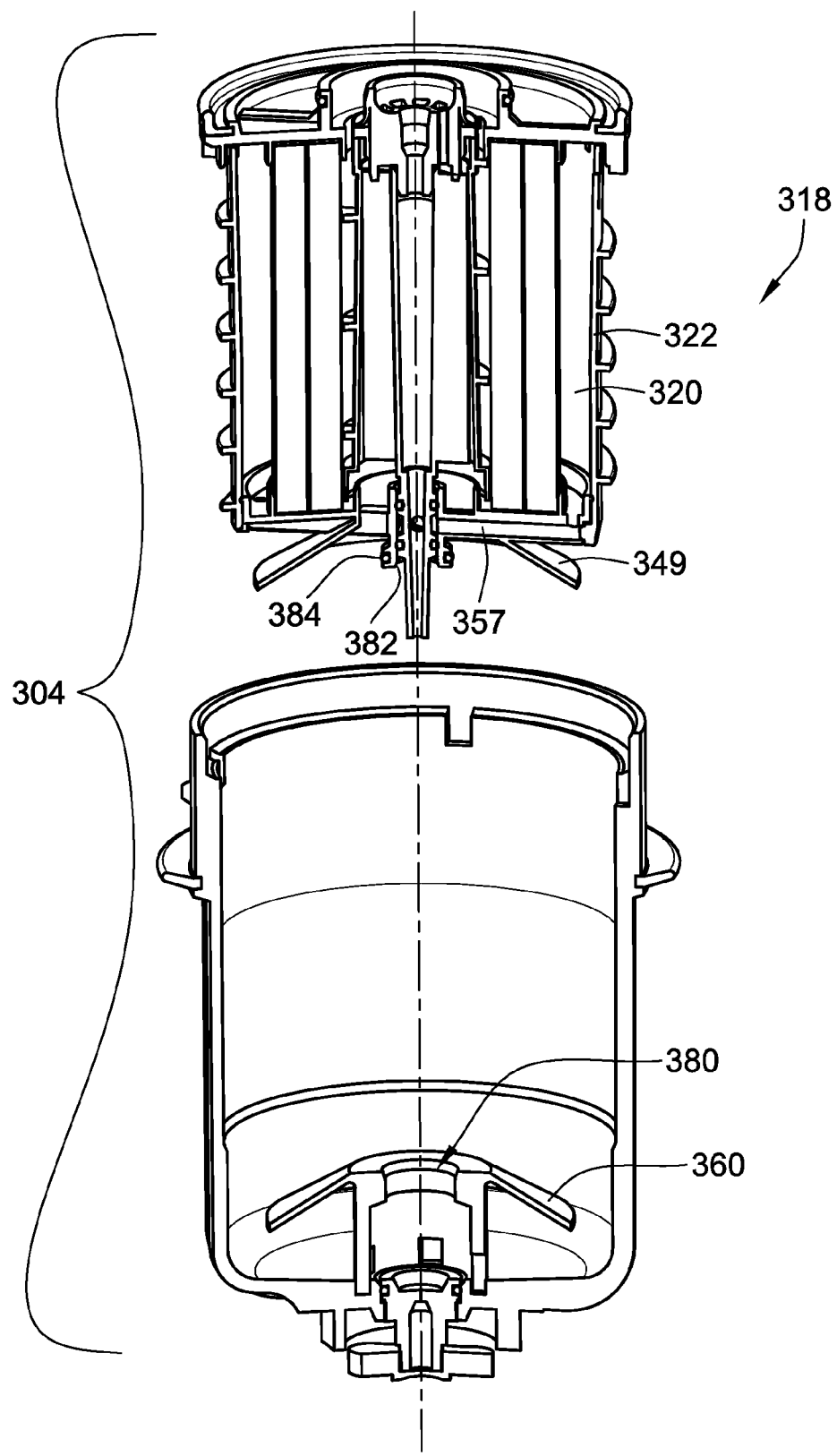
FIG. 9 is a partially exploded illustration of the filter of FIG. 7, illustrated in cross-section and perspective.

A further alternative embodiment of a filter assembly 300 including a filter base 302 and filter 304 according to the teachings of the present invention is illustrated in FIGS. 7-9. In this embodiment, the filter element 318 further includes an outer water stripping wrapper 322 that that surrounds the filter media 320. The water stripping wrapper 322 includes a helical thread 323 that causes the dirty fluid 106 to flow axially a substantial length of the filter media 320 after it exits the cone separator 332. The helical thread 323 also causes the dirty fluid 106 to flow angularly as it flows axially toward the filter base 302 from reservoir 336. The inclusion of the water stripping wrapper 322 causes additional water 335 that has coalesced to be removed from the dirty fluid flow 106.

The water stripping wrapper 323 includes flow ports 327 that cause the dirty fluid 106 to undergo a large change in flow direction as it flows from a cavity 351 formed between the sidewall 315 of the housing 314 and the outer surface of the water stripping wrapper 323 to a cavity 353 formed between an inner surface of the water stripping wrapper 323 and an outer surface of the filter media 320.

As stripped water 335 will develop in cavity 353 between the water stripping wrapper 323 and the filter media 320, the bottom end cap 330 includes a radial flow path 357 formed therein.

The radial flow path 357 communicates the inner fluid flow path 346 of center tube 340 with cavity 353. The inner wall 347 that forms the inner fluid flow path 347 of the center tube 340 includes at least one fluid flow port 363 that permits stripped water 335 to be drawn through radial flow path 357 and into inner flow path 346 to be ultimately removed from the filter 304. Stripped water 335 will join other stripped water 134 that was previously stripped using cone separator 332.

In this embodiment, the top cone portion 349 is integrally formed with bottom end cap 330. The top cone portion 349 mates with the bottom cone portion 360 to form flow path 368 (see FIG. 8).

The bottom cone portion 360 includes a central aperture 380 that receives an axially extending annular flange 382 of the bottom end cap 330. An o-ring seal 384 forms a radial seal between an inner surface of aperture 380 and the annular flange 382.

Annular flange 382 forms a central aperture 386 which receives inner wall 347 of center tube 340 therethrough. When assembled, the inner wall 347 extends through annular flange 382 of the bottom end cap 330 and into reservoir 336 of the filter 304.

Figure 10:
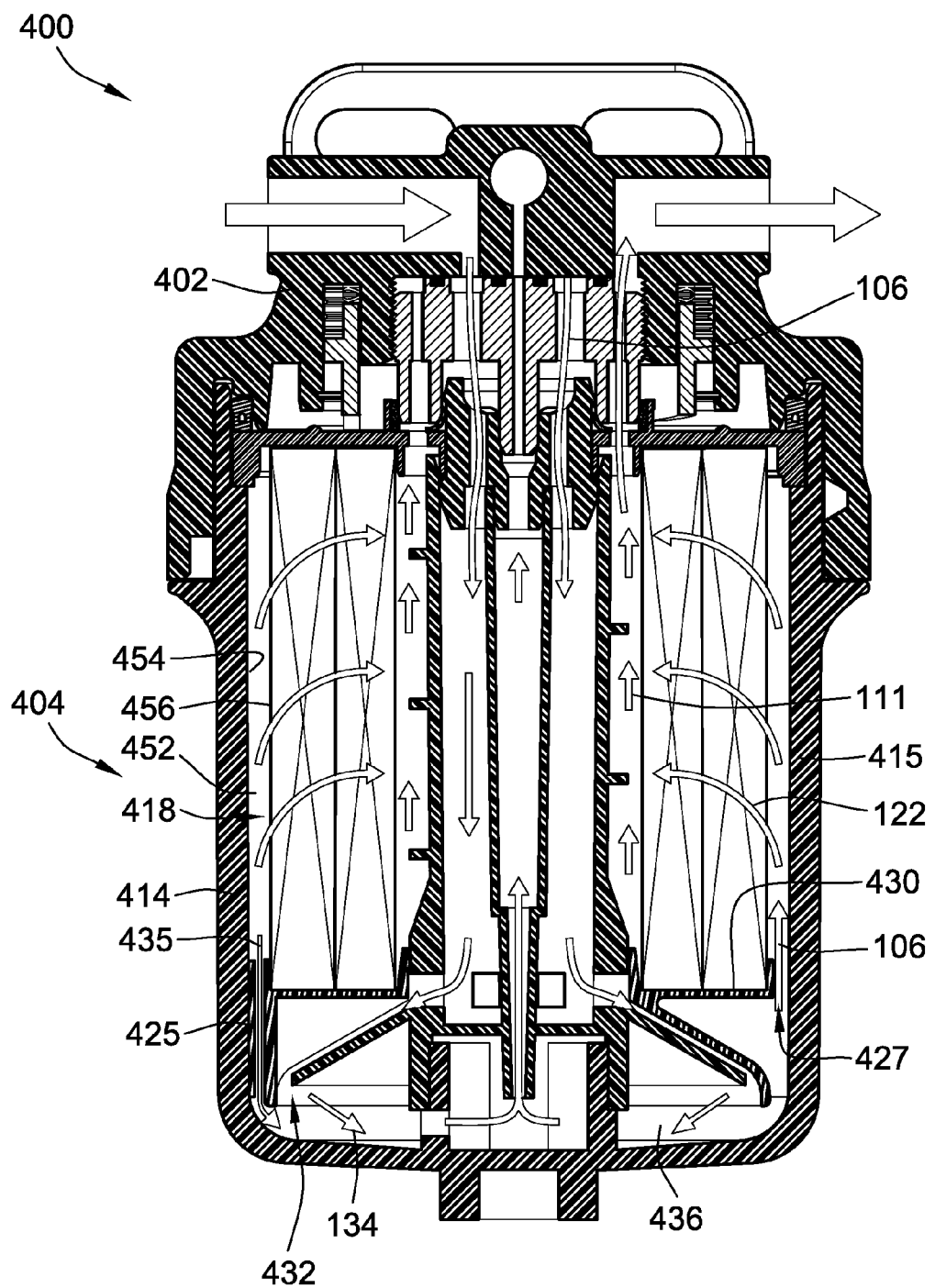
FIG. 10 is a cross-sectional illustration of a further exemplary embodiment of a filter assembly in accordance with the teachings of the present invention.
Figure 11:
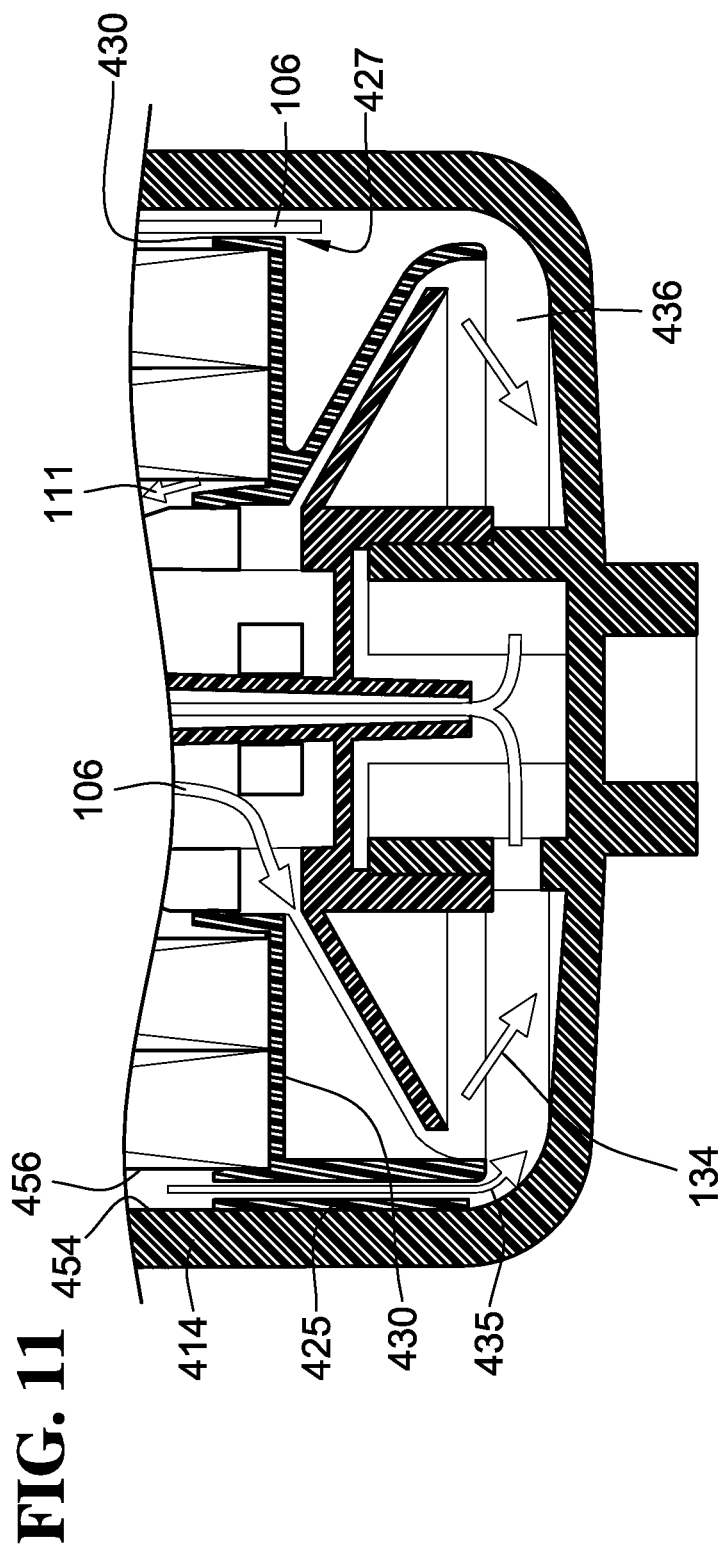
FIG. 11 is an enlarged illustration of a portion of the filter of the filter assembly of FIG. 1.
Figure 12:
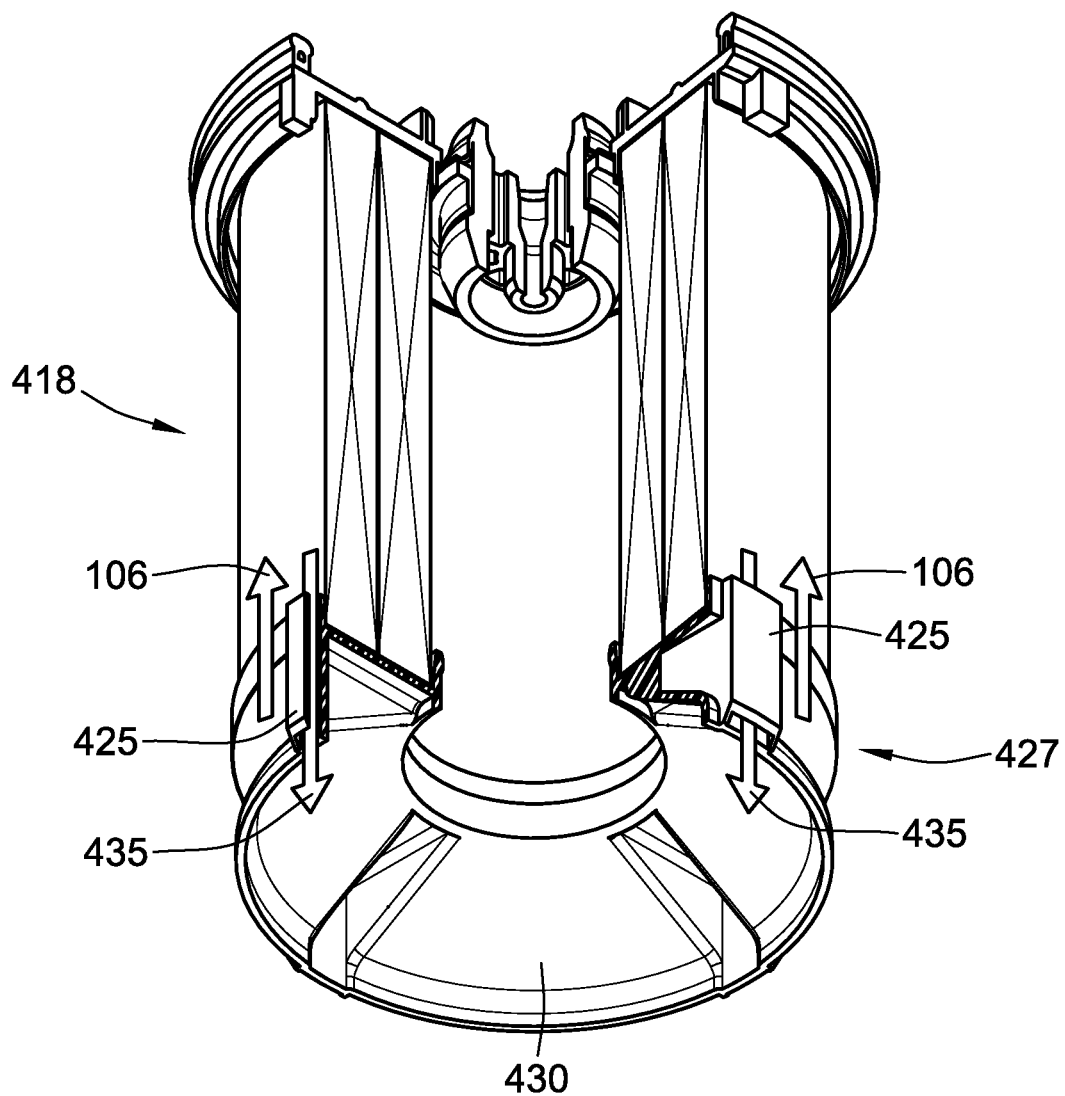
FIG. 12 is a perspective partial cross-section of the filter element of FIG. 10.

A further embodiment of a filter assembly 400 having a filter base 402 and filter 404 is illustrated in FIGS. 10 and 11. This embodiment is similar to the embodiment of FIGS. 4-6. As such, the primary differences in the embodiment will be focused upon. The filter element 418 of this embodiment (further illustrated in FIG. 12) includes a plurality of water flow ports 425 that are angularly spaced around the filter element 418. Adjacent ones of the water flow ports 425 are separated by and define therebetween dirty fluid flow paths 427.

When the filter element 418 is inserted into housing 414, the dirty fluid flow paths 427 extend angularly between adjacent ones of the stripped water flow ports 425 and radially between the sidewall 415 of housing 414 and bottom end cap 430.

Both the stripped water flow ports 425 and the dirty fluid flow paths 427 communicate the reservoir 436 with the cavity 452 formed between the inner surface 454 of sidewall 415 and the outer surface 456 of the filter media. The dirty fluid flow paths 427 are focused on permitting the dirty fluid 106 to flow from the reservoir 436 to cavity 452. The water flow ports 425 are focused on permitting water 435 that was not previously stripped by cone separator 432 that is subsequently stripped from the dirty fluid 106 as it passes through the filter media to settle into reservoir 436. The dirty fluid flow paths 427 experience a larger fluid flow and are provided with large flow areas.

One additional feature of this embodiment is that the water flow ports 425 can provide radial support for the filter element 418 at the bottom end cap 430 end of the filter element 418 when mounted within housing 414.

While the previous embodiments of filters and filter elements incorporate water separators configured to have fluid flow paths in the shape of a cone or similarly shaped, it is contemplated that the water separators could have the fluid flow paths be generally planar such that the paths are generally planar in the form of an annular disc.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element for insertion into a housing, comprising:
a tubular ring of filter media defining an internal cavity;

a first end cap sealingly secured to a first end of the filter media;

a second end cap sealingly secured to a second end of the filter media;

a portion of a water separator secured to the filter media, the portion forming an axially exposed coalescing surface facing axially away from the filter media and freely exposed when the filter element is removed from the housing; and the portion of the water separator being less than a full water separator, the filter element requiring cooperation with another portion of the water separator, separate from the filter element, to operate to separate water from fluid flowing through the filter element.

2. The filter element of claim 1, wherein the coalescing surface is conical.

3. The filter element of claim 2, wherein the end cap forms the portion of a water separator such that the end cap and the portion of a water separator are formed as a one-piece body.

4. The filter element of claim 2, wherein the end cap and the portion of a water separator are formed as separate independent components.

5. The filter element of claim 4, further including a seal member interposed between and connecting the end cap and the portion of a water separator.

6. The filter element of claim 5, wherein the end cap includes an annular disc portion defining an aperture, the portion of a water separator including an axially extending hub, the hub extending axially into the aperture.

7. The filter element of claim 6, wherein the seal provides a radial seal against the hub and a radial seal against the end cap.

8. The filter element of claim 2, further including a center tube within the internal cavity, the center tube defining a fluid flow passage that communicates with the conical surface.

9. The filter element of claim 8, wherein the center tube and the end cap are integrally formed in a single piece.

10. The filter element of claim 3, wherein the end cap includes an aperture through which a center tube of an external filter housing may extend into the internal cavity of the filter media, further including a seal between the center tube and the end cap.

11. The filter element of claim 10, wherein the seal is a resilient annular flange of the end cap bounding the aperture engaging an outer surface of the center tube.

12. A filter comprising:

a housing having a sidewall defining a central cavity;

a tubular ring of filter media defining an internal cavity removably positioned within the central cavity;

a first end cap sealingly secured to an end of the tubular ring of filter media defining a dirty fluid flow port; and a water coalescing cone having a top portion mounted to the tubular ring of filter media and a bottom portion mounted to the housing, the top and bottom portions combining to form a generally conical coalescing flow path therebetween in fluid communication with the dirty fluid flow port; and wherein the tubular ring of filter media is removable from the housing and the top portion of the water coalescing cone is fixedly mounted to the tubular ring of filter media such that removal of the filter media from the housing removes the top portion of the water coalescing cone from the housing while the bottom portion of the water coalescing cone remains with the housing and is reusable.

13. The filter of claim 12, wherein the top portion of the water coalescing cone is formed with the first end cap in a single body.

14. The filter of claim 12, wherein the top portion of the water coalescing cone is structurally independent of the first end cap and is sealingly attached to the first end cap.

15. The filter of claim 12, wherein one of the top portion or bottom portion forms a generally concave surface and the other one of the top portion or bottom portion forms a cooperating convex surface, the convex and concave surfaces being spaced apart to form the coalescing flow path therebetween.

16. The filter of claim 12, further comprising a center tube extending axially into the internal cavity and defining a dirty fluid inlet passage that communicates with the coalescing flow path.

17. The filter of claim 16, further including a second end cap sealingly secured to an opposite end of the tubular ring of filter media as the first end cap, the top end cap defining a dirty fluid inlet therethrough, the dirt fluid inlet passage of the center tube fluidly communicating the dirty fluid inlet with the water coalescing flow path.

18. The filter of claim 17, wherein the center tube is integrally formed with the bottom portion of the water coalescing cone, the top portion of the water coalescing cone including an aperture through which the center tube passes.

19. The filter of claim 17, wherein the center tube is permanently secured to the filter housing.

* * * * *